United States Patent
Konno et al.

[11] Patent Number: 5,946,162
[45] Date of Patent: Aug. 31, 1999

[54] DD MOTOR IN MAGNETIC DISK DRIVE

[75] Inventors: Makoto Konno; Hisashi Shibata; Koichi Seno, all of Yamagata, Japan

[73] Assignee: Mitsumi Electric Co, Ltd., Tokyo, Japan

[21] Appl. No.: 09/020,507

[22] Filed: Feb. 9, 1998

[30] Foreign Application Priority Data

Feb. 10, 1997 [JP] Japan .................................. 9-027052

[51] Int. Cl.⁶ .................................................. G11B 17/02
[52] U.S. Cl. ..................................... 360/99.08; 360/98.07
[58] Field of Search ............................. 360/99.08, 98.07

[56] References Cited

U.S. PATENT DOCUMENTS

4,658,312 4/1987 Elsasser et al. ...................... 360/99.08
5,835,513 12/1998 Kelsic ............................... 360/99.08 X

*Primary Examiner*—John H. Wolff
*Attorney, Agent, or Firm*—Whitham, Curtis & Whitham

[57] ABSTRACT

A DD motor in a magnetic disk drive is disclosed. The DD motor comprising a sheet of metal plate formed in a two-stage disk-shaped, which includes an upper stage portion having an opening at the center thereof and a lower stage portion provided continued from the upper stage portion, a spindle shaft served as a central axis of the DD motor and inserted into the opening of the upper stage portion, and a resin portion formed integrally on a top face and a back face of the upper stage portion, in which magnetic material powder is mixed, wherein the resin portion connects the spindle shaft and the metal plate uniformly. Central axes of the small diameter disk-shaped upper stage portion and the large diameter disk-shaped lower stage portion are located coaxially. A peripheral edge of the upper stage portion is bent downwards to form a rim.

18 Claims, 7 Drawing Sheets

DD MOTOR IN MAGNETIC DISK DRIVE

BACKGROUND OF THE INVENTION

1. Technical Field of the Invention

The present invention relates to a DD (disk drive) motor in a magnetic disk drive, in particular, for use in 3.5-inch floppy disk drive.

2. Related Art

Figure 8:
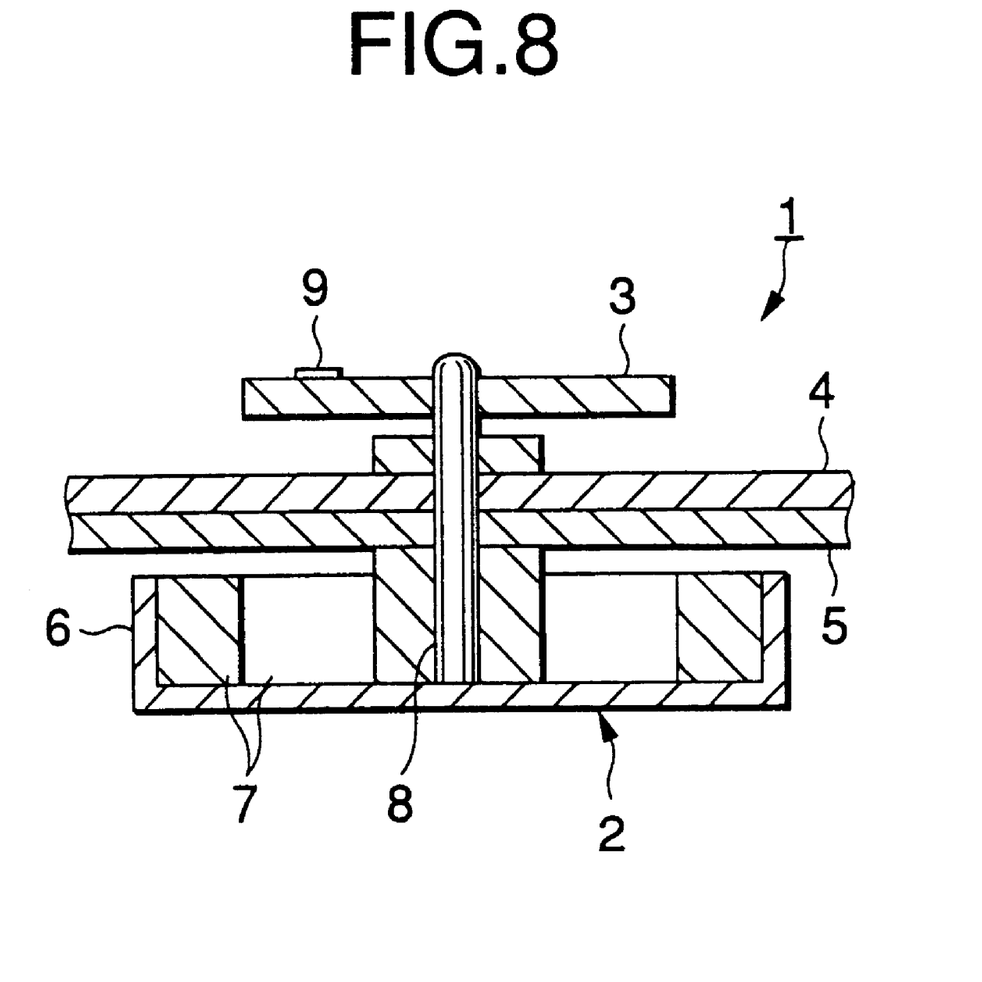
FIG. 8 is a vertical section view of a conventional DD motor in a 3.5-inch floppy disk drive.

In a conventional DD motor 1 as shown in FIG. 8, a rotor 2 and a disk table 3 are separated by a frame 4 provided therebetween for shielding magnetic field. A printed board 5 is disposed on a surface of the frame 4 which faces onto the rotor 2. A coil is provided on a surface of the printed board 5. An induction magnetic field generated from the coil acts on a ring-like rotor magnet 7 disposed on an inner peripheral face of rim 6 in the rotor 2, thereby the rotor 2 is rotated.

A spindle shaft 8 in the rotor 2 is projected from the other surface of the frame 4 by piercing the printed board 5 and the frame 4, and the disk table 3 is fitted on the top end of the spindle shaft 8. When a magnetic disk, for instance 3.5-inch floppy disk (not shown), is set upon the disk table 3, a metal hub of the magnetic disk is attracted by the disk table 3 because the disk table 3 is made of magnet. Besides, a chucking roller 9 is mounted on one side of the top face of the disk table 3, wherein the chucking roller 9 is vertically movable with regard to the disk table and urged upwards in a normal state. When the hub of the magnetic disk is abutted against the disk table 3, the chucking roller 9 is sunk into the disk table 3.

Then while the disk table 3 is rotated by the rotation of the rotor 2, if the chucking roller 9 arrives at the position of a window formed in the hub, it is pushed upwards and is thereby engaged with the window. In this manner, the magnetic disk is chucked with the disk table 3 and thereby can be rotated with the rotor 2.

Thus in this kind of the disk drive, while the rotor starts to rotate and the chucking roller is engaged with the window of the magnetic disk hub, the disk table and the hub of the magnetic disk are rubbed on each other. Therefore, it is desirable that friction resistance of the disk table is less. Using such a material, however, the magnetic force of the disk table is decreased and there is fear of that it would not work as the chucking magnet.

SUMMARY OF THE INVENTION

In view of the above, the object of the present invention is to provide a DD motor in a magnetic disk which has a disk table having lower friction resistance without losing its function as a chucking magnet.

To achieve the object, there is provided a DD motor in a magnetic disk drive comprising a sheet of metal plate formed in a two-stage disk-shaped which includes an upper stage portion having an opening at the center thereof and a lower stage portion provided continually from the upper stage portion. A spindle shaft serves as a central axis of the DD motor and is inserted into the opening of the upper stage portion is, and a resin portion formed integrally on a top face and a back face of the upper stage portion, in which magnetic material powder is mixed. The resin portion connects the spindle shaft and the metal plate uniformly.

DETAILED DESCRIPTION OF THE EMBODIMENT

Figure 1:
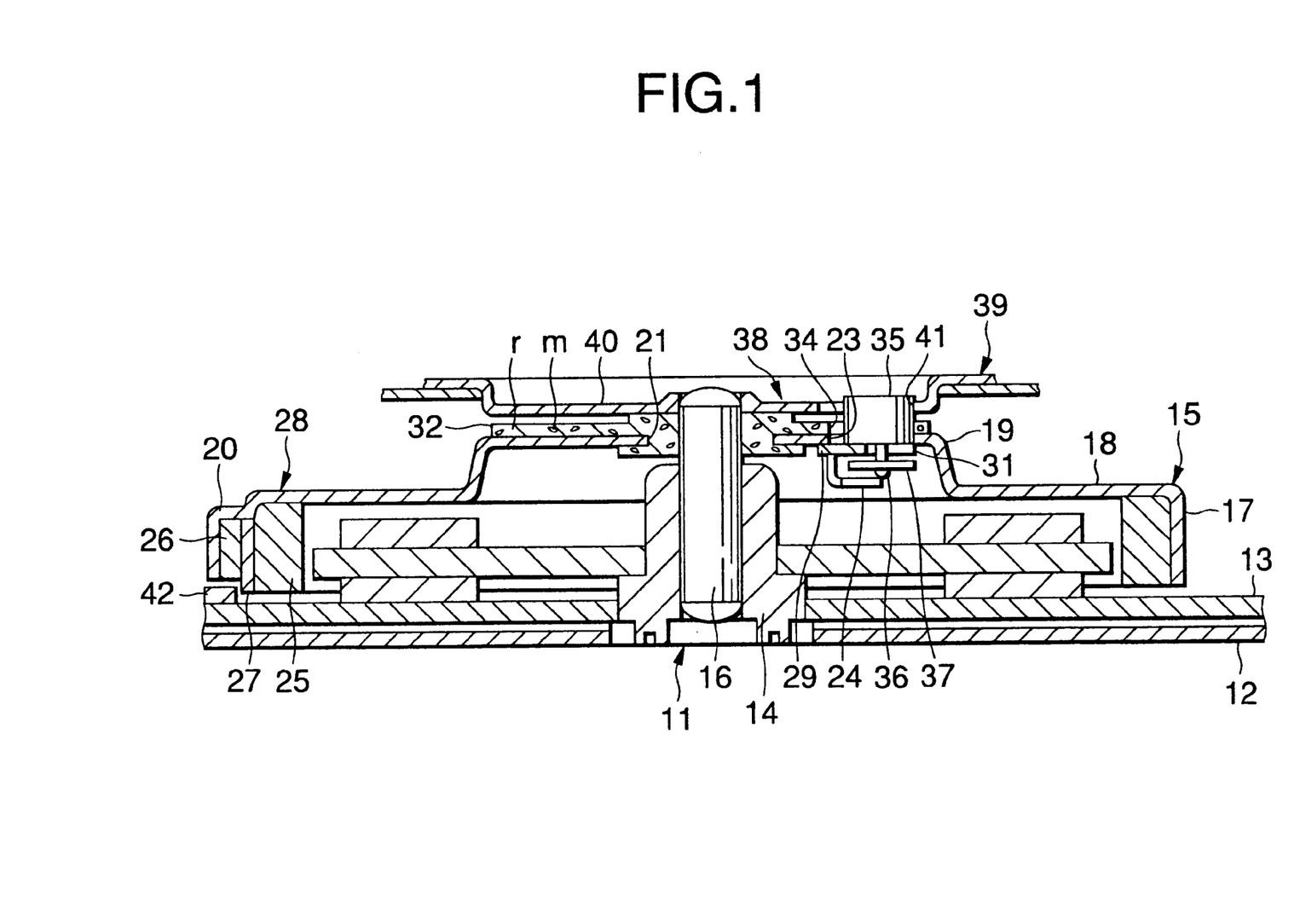
FIG. 1 is a vertical section view of a DD motor in a 3.5-inch floppy disk drive wherein a 3.5-inch floppy disk is fitted, showing one embodiment of the present invention.

Now, descriptions will be given below in detail of one embodiment of the present invention with reference to FIGS. 1 to 7. In FIG. 1, the numeral 11 is a DD motor of the 3.5-inch floppy disk drive. A printed board 13 lies on top face of a frame 12 of DD motor, and a bearing 14 is disposed at central portion of the frame 12. A spindle shaft 16 of a two-stage disk member 15 is rotatably supported by the bearing 14.

Figure 2:
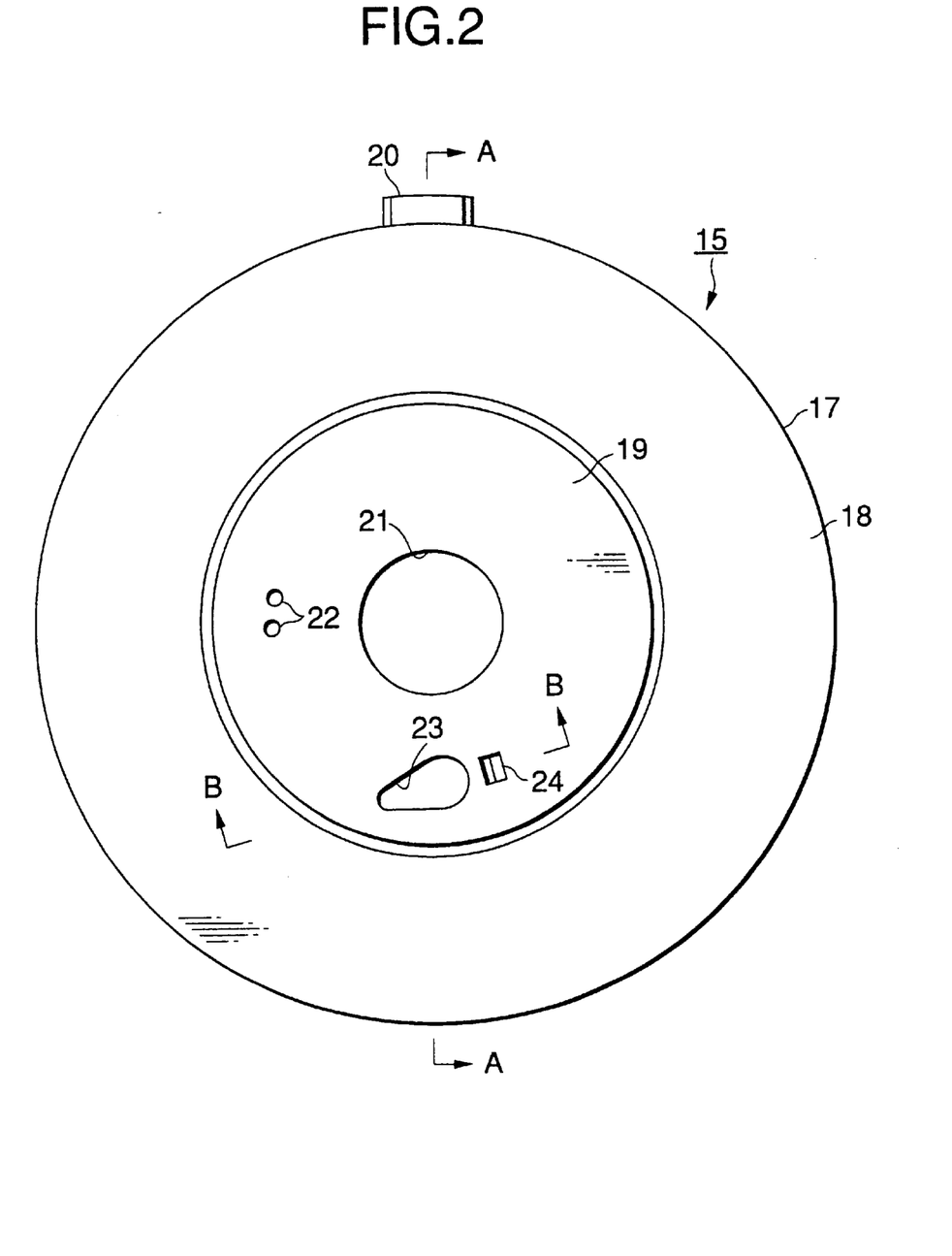
FIG. 2 is a plan view of the two-stage disk member shown in FIG. 1.
Figure 3:
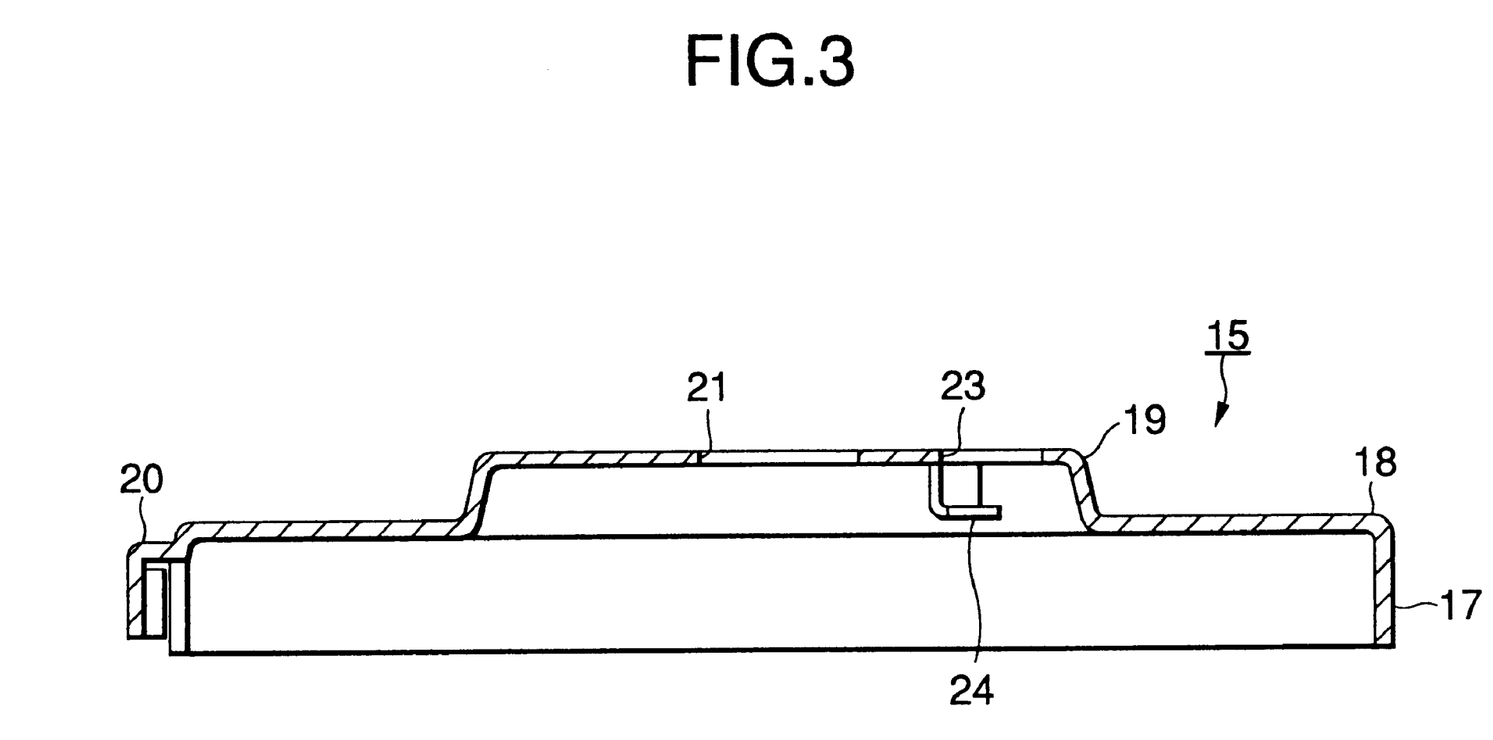
FIG. 3 is a section view taken along the line A—A shown in FIG. 2.
Figure 4:
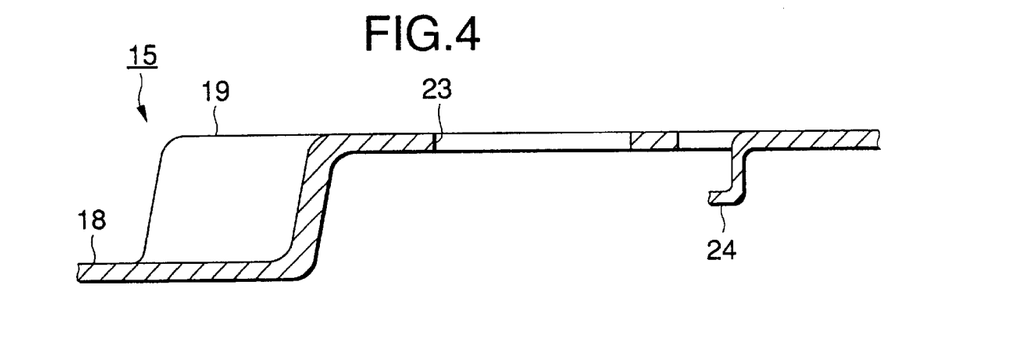
FIG. 4 is a section view taken along the line B—B shown in FIG. 2.

As shown in FIGS. 2 to 4, by means of press molding, the two-stage disk member 15 is formed into a bottomless two-stage disk-like shape such that a small diameter disk portion 19 positions at center of top face of a large diameter disk portion 18. The shape is formed by using the following procedures in detail. First, a steel plate is punched in a circular shape, and its peripheral edge is bent downwards to form a rim 17. Next, the center of the steel plate is upheaved circularly by press. An index box 20 is formed on one side of the rim 17 which corresponds to an outer peripheral end face of the large diameter disk portion 18. A central hole 21 is opened up on the center of upper face of the upper stage of the two-stage disk member 15 which corresponds to the upper face of the small diameter disk portion 19. Also, small holes 22, 22 and an opening 23 are opened up at a predetermined position. Moreover, hook-like stopper 24 is formed by cutting and bending the steel plate. The stopper 24 is used for preventing a chucking roller 35 from sinking any further as descried later.

Figure 5:
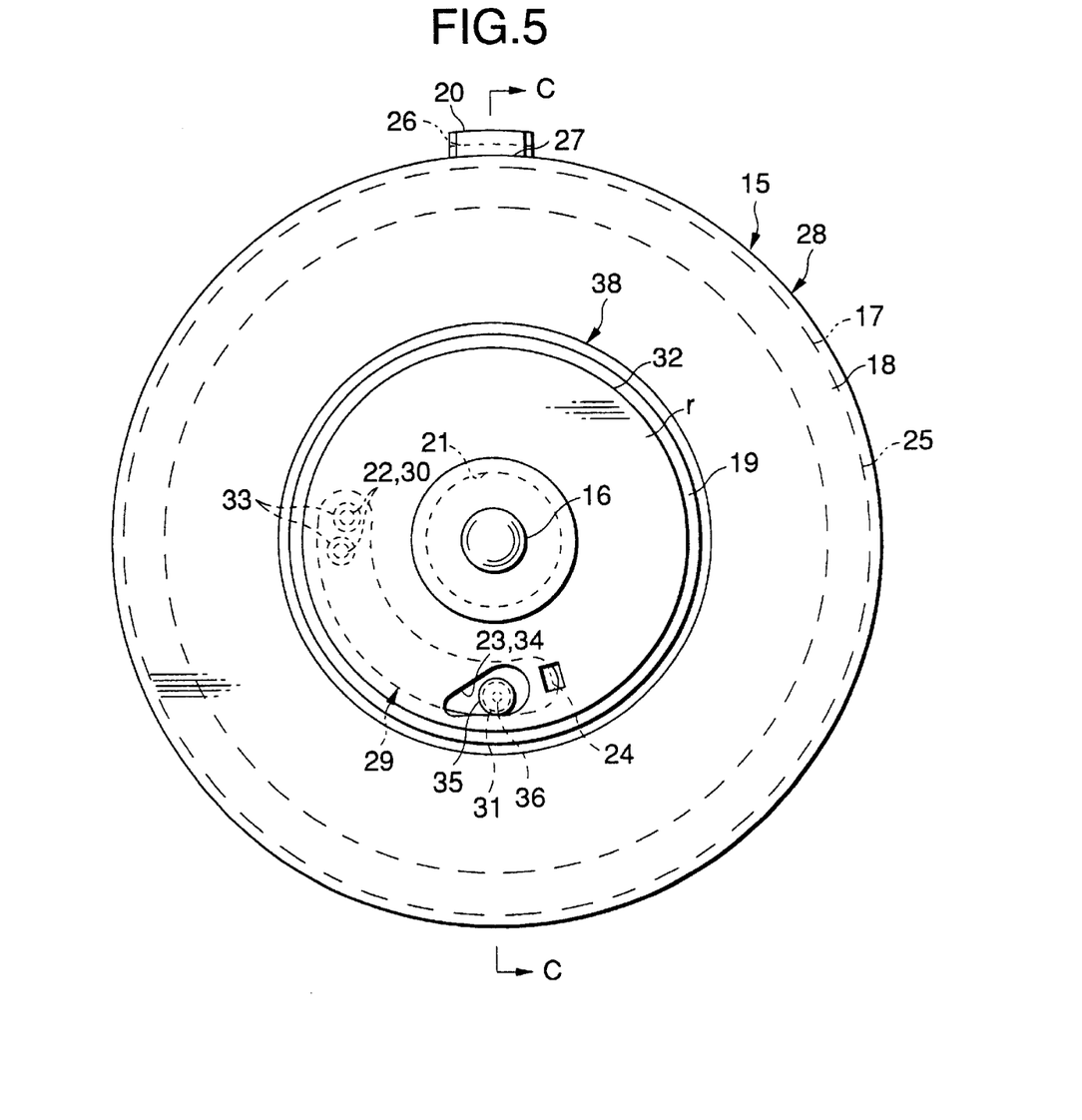
FIG. 5 is a plan view of the rotor and the disk table shown in FIG. 1.
Figure 6:
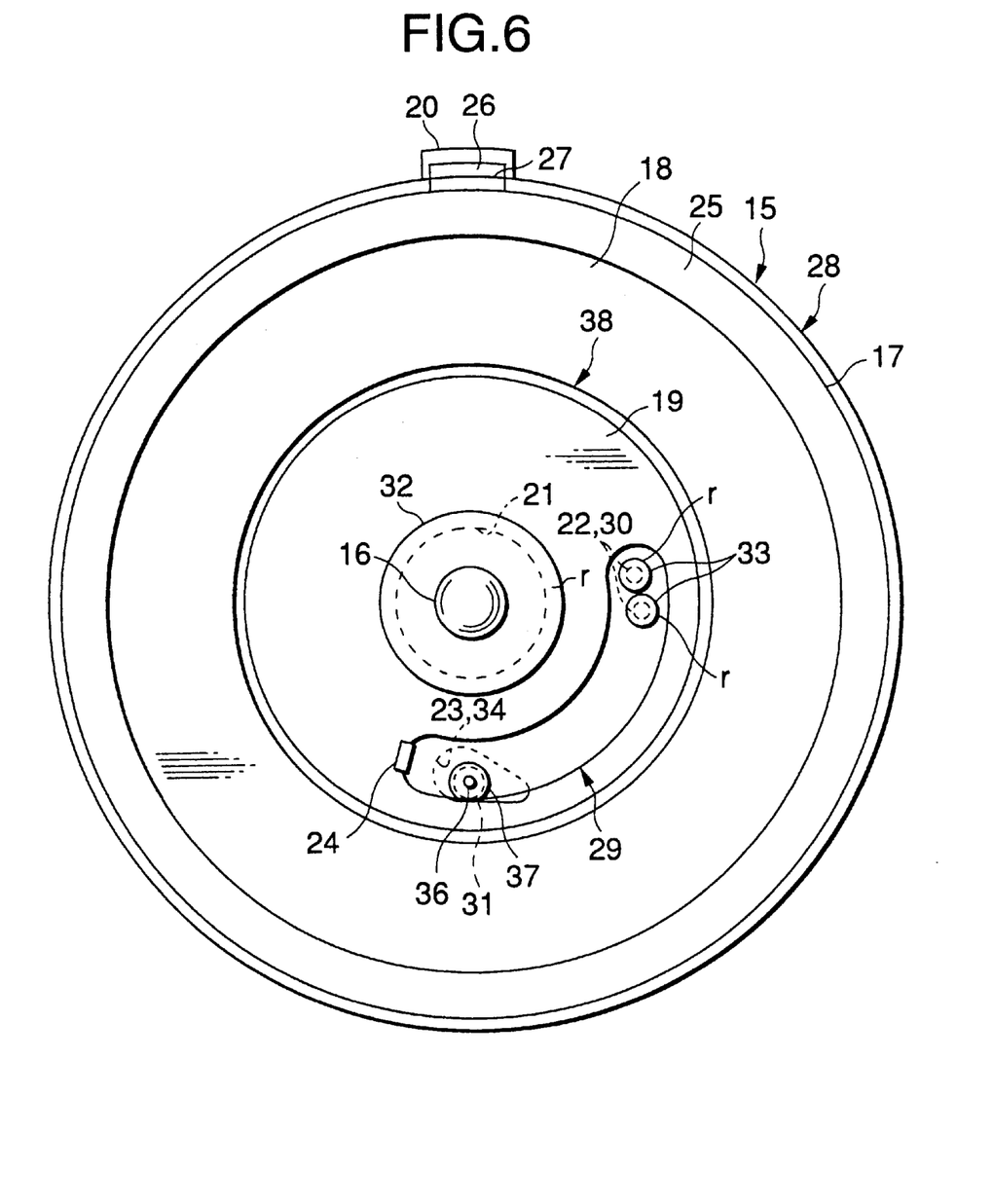
FIG. 6 is a bottom view of the FIG. 5.
Figure 7:
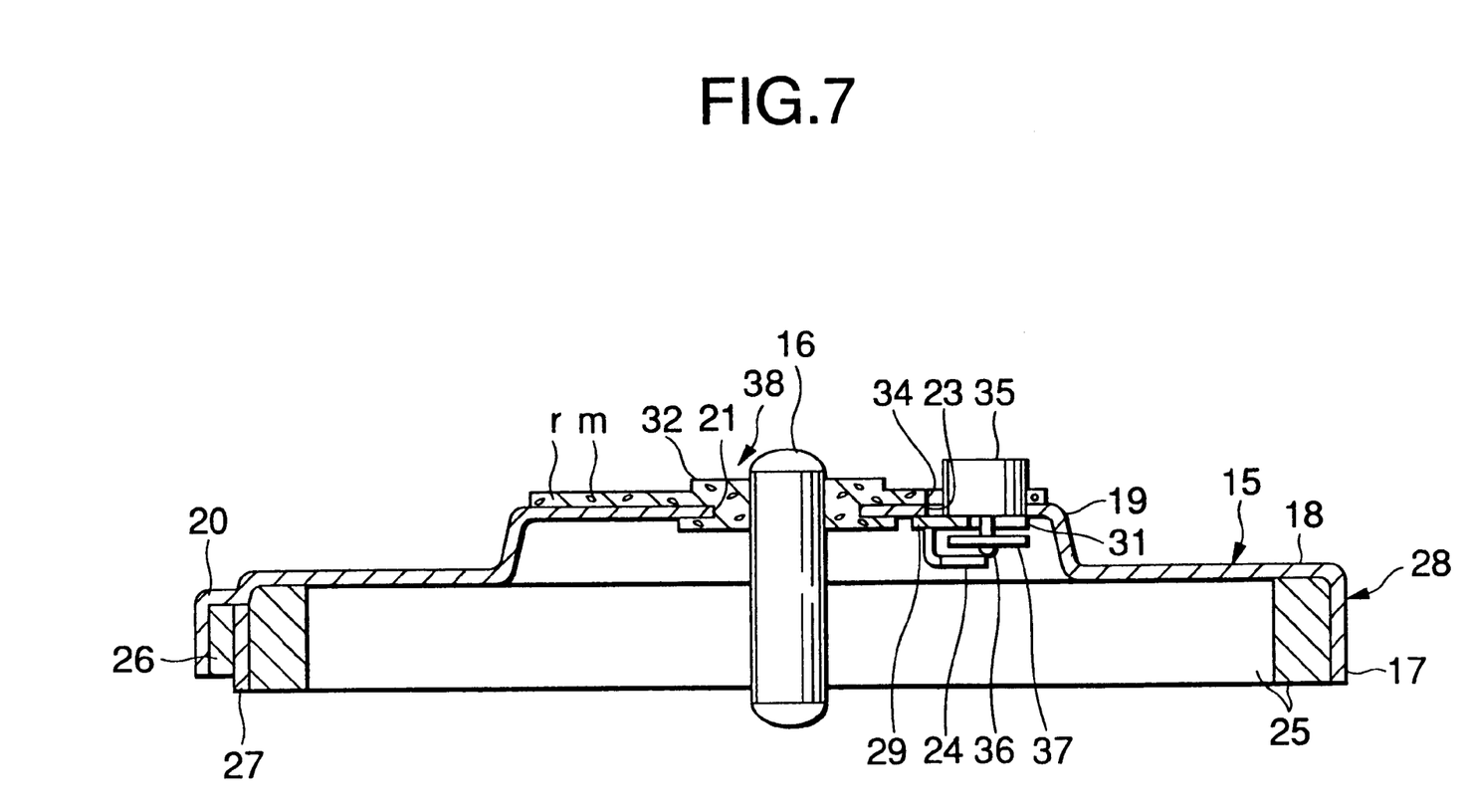
FIG. 7 is a section view taken along the line C—C shown in FIG. 5.

As shown in FIGS. 5 to 7, a ring-like rotor magnet 25 is fitted on an inner peripheral face of the rim 17, and an index magnet 26 is accommodated in the index box 20. Further, the index magnet 26 and the rotor magnet 25 are separated by a separator piece 27 which is made of a steel plate as same as the two-stage disk member 15. In this manner, a rotor 28 is formed.

An arc-shaped chucking arm 29 made of an elastic thin plate which is applied to the back face of the upper stage of the two-stage disk member 15. At the time, two small holes 30, 30, which are respectively opened up in the vicinity of one end portion of the chucking arm 29, are met with the small holes 22, 22 of the two-stage disk member 15, and the other end portion of the chucking arm 29 is inserted into the interior portion of the stopper 24. By the way, in the vicinity of the other end portion of the chucking arm 29, there is formed a hollowed circular-shaped notch 31 which is open in the direction of the end edge of the outer periphery of the chucking arm 29; and, the notch 31 is situated just inside the opening 23.

After a spindle shaft is inserted into the central opening 21 and set into a predetermined position, a chucking member 32 is molded out of resin material r, which contains powder material m to be magnetized, such that the spindle shaft 16 and the two-stage disk member 15 are integrally connected. The resin material r is made of nylon, for example, and the powder material m is made of ferrite, for example. As clearly seen in FIG. 1, the chucking member 32 is formed on the top and back faces of the upper stage of the two-stage disk member 15 while the central opening 21 is filled thereby. After then, magnetic field is applied to the chucking member 32 to magnetize the powder material as magnetic powder material m. Resultantly, the chucking member 32 is magnetized as chucking magnet 32 powder) m is previously mixed in the resin r. Initially, the magnetic material powder m is not magnetized, and after the resin r is molded, a magnetic field is applied to the molding to thereby magnetize the magnetic material powder m. In this manner, a chucking magnet 32 which is resin r including magnetized magnetic material powder m is formed.

This chucking magnet 32 allows the spindle shaft 16 to be connected to the two-stage disk member 15. Further, part of the resin r (including the magnetic material m) forming the chucking magnet 32 is also filled into the two small holes 22, 22 opened up in the two-stage disk member 15 as well as into the two small holes 30, 30 opened up in the chucking arm 29, and further the thus inserted resin r (including the magnetic material m) flows out from the two small holes 30, 30 and spreads out onto the lower surface of the chucking arm 29, thereby forming two members 33 and 33 for the chucking arm 29. In this manner, one end of the chucking arm 29 is fitted with and is thereby integrally connected with the two-stage disk member 15 in a cantilever manner.

Besides, the resin r is not filled into the opening 23 so that the opening 23 can be left as it is. That is, in the chucking magnet 32, there is formed an opening 34 which can be met with the opening 23. And, a chucking roller 35 is inserted into the openings 23 and 34. The chucking roller 35 includes a small-diameter shaft pin 36 which is so formed as to hang down along the central portion of the lower surface thereof. When the chucking roller 35 is inserted, the shaft pin 36 is inserted into the notch 31 of the chucking arm 29 and the chucking roller 35 is placed on the chucking arm 29. And, a washer 37 is put on the tip end of the shaft pin 36 projecting downwards from the lower surface of the chucking arm 29, and the leading end of the shaft pin 36 is crushed and staked. In this manner, the chucking roller 35 is floatably engaged within the notch 31 as well as within the openings 23 and 34. A disk table 38 combined with the rotor 28 is thereby formed above the center of rotor 28.

Disposing a 3.5-inch floppy disk 39 on the disk table 38, as shown in FIG. 1, a hub 40 of the 3.5-inch floppy disk 39 is attracted by the chucking magnet 32 and is adhered with it. At the time, the two-stage disk member 15 works as a back yoke of the chucking magnet 32, and therefore enough attractive force could be obtained even if the amount of magnetic material powder m mixed into the resin r is decreased.

If the hub 40 adheres on the chucking magnet 32, the chucking roller 35 is pressed down by the hub 40 and is thereby caused to sink downwards, which in turn bends the chucking arm 29. Then, if a drive current is applied to a coil formed on the printed board 13, then a magnetic field is generated around the coil and the magnetic field acts on the rotor magnet 25 to thereby cause the rotor 28 to rotate clockwise when viewed from a plan view thereof. Here, since the chucking roller 35 is urged upwards due to the curve of the chucking arm 29, when the chucking roller 35 arrives at the position of a window 41 formed in the hub 40, then it is pushed upwards and is thereby engaged with the window 41. In this manner, the 3.5-inch floppy disk 39 is chucked and, after then, the 3.5-inch floppy disk 39 can be rotated together with the disk table 38.

After the 3.5-inch floppy disk 39 is inserted in this disk drive, while the rotor 28 and the disk table 38 start to rotate and the chucking roller 35 is engaged with the window 41, the chucking magnet 32 and hub 40 are rubbed (e.g, contact) on each other. Therefore, it is desirable that friction resistance of the disk table is less. Here, as described the above, increasing the amount of ingredients of nylon, etc. or decreasing the amount of the magnetic material powder m in the chucking magnet 32, the friction resistance between the chucking magnet 32 and the hub 40 can be reduced, and the chucking magnet 32 would not thereby lose the function thereof.

A rotation angle detecting device 42 is disposed at a predetermined position on the printed board 13 to detect the magnetic field of the index magnet 26 every time the index magnet 26 passes through above the rotation angle detecting device 42. On the other hand, a magnetic head (not shown) is applied to the 3.5-inch floppy disk 39 and then magnetic information can be recorded or reproduced. At the time, the two-stage disk member 15 works as a magnetic shield, and thereby the read or recorded information is not disarranged by the rotor magnet 25 or the index magnet 26.

Also, according to the present invention, various changes and modifications are possible without departing from the scope and spirit of the invention and, of course, the present invention can cover such changes and modifications.

As has been described heretofore, according to the DD motor of the present invention, due to fact that the two-stage disk-shaped metal plate works as the back yoke of the chucking magnet when it attracts the hub of the magnetic disk, enough attracting force can be obtain even if the magnetic force of the chucking magnet thereof is weak. Therefore, the amount of resin ingredients can be increased instead of decreasing the magnetic material powder content.

Since thereby the friction resistance between the chucking magnet and the hub can be reduced, accuracy of positioning the magnetic disk would be improved. Also, it contributes for reduction of material costs.

What is claimed is:

1. A DD motor in a magnetic disk drive comprising:
 a sheet of metal plate formed in a two-stage disk-shaped, the two-stage disk-shaped metal plate including an upper stage portion having an opening at the center thereof and a lower stage portion formed continually from the upper stage portion;
 a spindle shaft serving as a central axis of the DD motor and being inserted into the opening of the upper stage portion; and
 a chuck formed integrally on a top face and a back face of the upper stage portion and at peripheral edges within the opening of the upper stage, the chuck includes a mixture of resin and magnetic material powder and connects the spindle shaft and the metal plate at the opening of the upper stage.

2. The DD motor in the magnetic disk drive as set forth in claim 1, wherein central axes of said small diameter disk-shaped upper stage portion and said large diameter disk-shaped lower stage portion are located coaxially.

3. The DD motor in the magnetic disk drive as set forth in claim 1, wherein a peripheral edge of said upper stage portion is bent downwards to form a rim.

4. The DD motor in the magnetic disk drive as set forth in claim 3, further comprising:

a ring-like magnet disposed on an inner peripheral face of said rim; and a coil disposed in the vicinity of the ring-like magnet under said lower stage portion to consist a rotor.

5. The DD motor in the magnetic disk drive as set forth in claim 4, wherein said metal plate shields magnetic field generated from said ring-like magnet.

6. The DD motor in the magnetic disk drive as set forth in claim 3, further comprising an index box formed on one side of the rim corresponding to an outer peripheral end face of the lower stage portion.

7. The DD motor in the magnetic disk drive as set forth in claim 6, further comprising:

an index magnet located within the index box;

a ring-like magnet located on an inner surface of the rim; and a separator piece separating the index magnet from the ring-like magnet.

8. The DD motor in the magnetic disk drive as set forth in claim 1, wherein the resin is nylon.

9. The DD motor in the magnetic disk drive as set forth in claim 1, wherein the magnetic material is ferrite.

10. The DD motor in the magnetic disk drive as set forth in claim 1, wherein the lower stage portion has a larger diameter than the upper stage portion.

11. The DD motor in the magnetic disk drive as set forth in claim 1, further including holes formed on the upper stage portion proximate to the opening.

12. The DD motor in the magnetic disk drive as set forth in claim 11, wherein the chuck is formed partly in the holes.

13. The DD motor in the magnetic disk drive as set forth in claim 11, further comprising a hook-like stopper formed on the back face of the upper stage portion and corresponding to one of the holes.

14. The DD motor in the magnetic disk drive as set forth in claim 13, further comprising a chucking arm on the back surface of the upper stage of the two stage disk member, the chucking arm being arc shaped and extending between at least one of the holes and the stopper.

15. The DD motor in the magnetic disk drive as set forth in claim 14, wherein the chucking arm includes holes at an end thereof and corresponds to the holes in the upper stage of the two stage disk member opposing the stopper.

16. The DD motor in the magnetic disk drive as set forth in claim 1, wherein the chuck forms a chucking magnetic which attracts a disk to a hub of the magnetic disk drive.

17. The DD motor in the magnetic disk drive as set forth in claim 16, wherein the two stage disk member is a back yoke for the chucking magnet such that regardless of an amount of the magnetic material powder used to form the chucking magnetic the attraction remains between the hub of the magnetic disk drive and the disk.

18. A DD motor in the magnetic disk drive comprising:

a disk plate having an upper portion and a lower portion, the upper portion having an opening extending therethrough;

holes formed proximate to the opening of the upper portion;

a stopper formed on a lower surface of the upper portion and formed from an aperture opposing the holes;

a chucking magnet formed from a resin and a magnetic powder, the chucking magnet formed on an upper surface and a portion of the lower surface of the upper portion of the disk plate, the chucking magnet also being partially formed within the opening and the holes of the upper portion of the disk plate;

a spindle located within the remaining portion of the opening of the upper portion, the resin molded material connecting the spindle to the disk plate.

* * * * *